Aug. 12, 1958  B. F. GRIB  2,847,637
VOLTAGE REGULATOR FOR A. C. POWER SUPPLIES
Filed Sept. 21, 1956
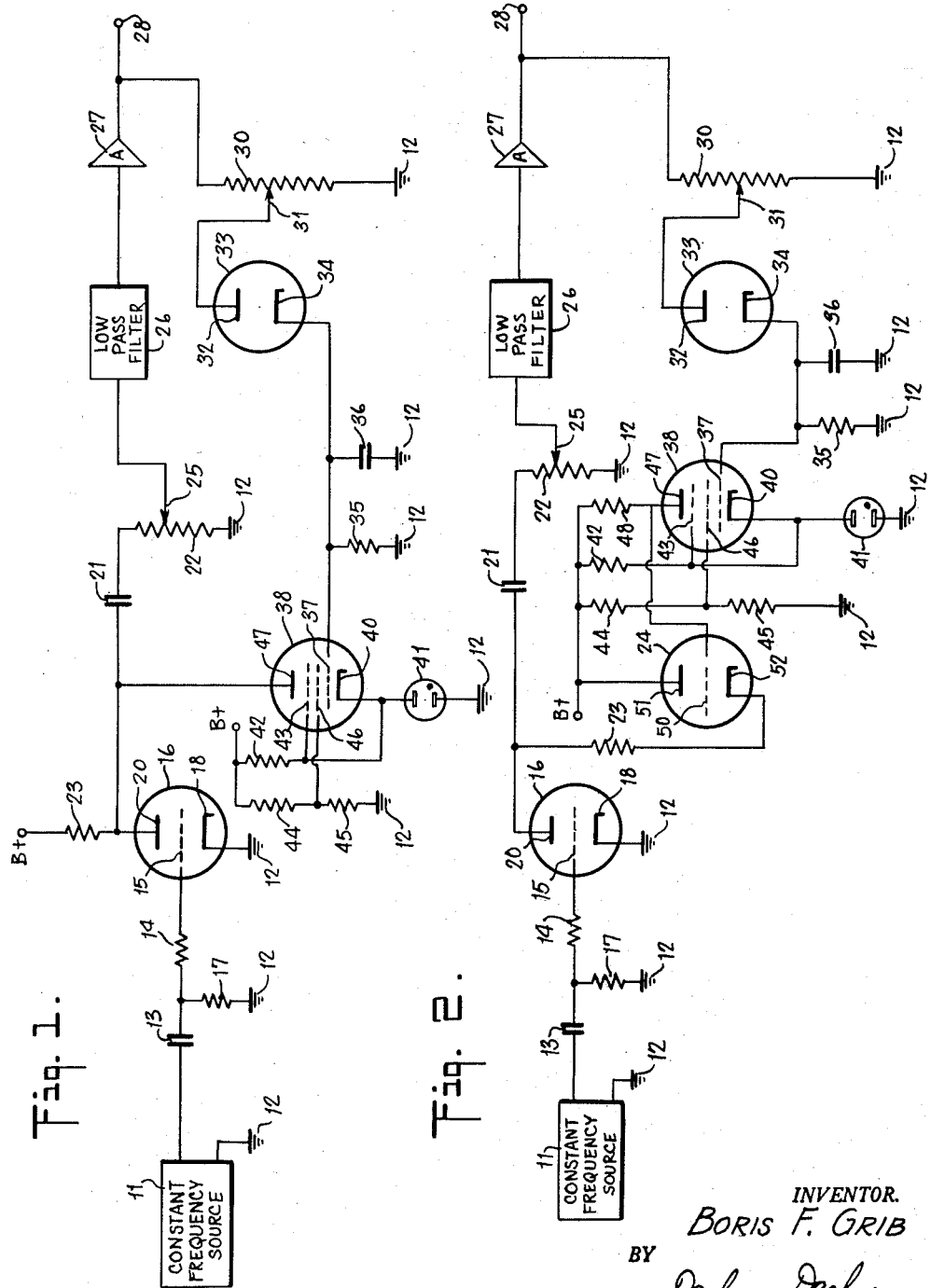
INVENTOR.
BORIS F. GRIB
BY
Darby + Darby
ATTORNEYS

United States Patent Office 2,847,637
Patented Aug. 12, 1958

2,847,637

VOLTAGE REGULATOR FOR A. C. POWER SUPPLIES

Boris F. Grib, Huntington Station, N. Y., assignor to Philamon Laboratories, Inc., Westbury, Long Island City, N. Y., a corporation of New York Application September 21, 1956, Serial No. 611,284

6 Claims. (Cl. 323—22)

The present invention relates to voltage regulators for alternating current power supplies and more particularly to such voltage regulators in which the alternating output voltage is regulated with reference to a voltage reference device such as a gas tube.

Various electronics applications require a constant-voltage constant-frequency power supply. A desirable method of providing such a power source is by the use of a constant frequency source with a high degree of frequency stability and a power-amplifier to increase to practical values the usually small power output of the constant-frequency source. The present voltage regulator circuit is described as applied to such a power supply, hereinafter termed an A. C. power-amplifier power supply.

Such a system is subject to output voltage variations from a variety of influences, among them load current changes, A. C. input variations, and temperature changes. It is possible to reduce the output voltage variation to some extent by the introduction of elements which tend to compensate for these changing conditions, but the effectiveness of this approach is limited.

Voltage-reference devices are available which provide a very stable voltage reference, and the present invention is directed to a voltage regulator for a power-amplifier power supply which incorporates a stable voltage reference and attains an overall degree of voltage stability which is comparable to the high degree of voltage stability of voltage-reference gas tubes.

It is an object of the present invention to provide a voltage regulation circuit for an A. C. power amplifier power supply which utilizes a voltage-reference device and has a high degree of voltage stability comparable to that of a voltage reference device.

It is another object of the present invention to provide a voltage regulation circuit for an A. C. power-amplifier power supply which utilizes a voltage reference device and which is adjustable to provide a wide range of stable output voltages.

It is another object of the present invention to provide an alternating-current power-amplifier power supply voltage regulator which maintains a steady output voltage in the presence of rapidly changing conditions.

It is a further object of the present invention to provide a voltage regulator circuit for an alternating current power-amplifier power supply in which the voltage regulation function consumes very little power.

It is a still further object of the present invention to provide a voltage regulator circuit for an A. C. power-amplifier power supply which introduces very little distortion in the wave form of the power supply output.

Other objects and advantages of the present invention will be apparent from consideration of the following description of the invention together with the appended drawings, in which:

Fig. 1 shows a schematic circuit diagram of a voltage regulation circuit for alternating-current power-amplifier power supplies, embodying the present invention;

Fig. 2 is a schematic circuit diagram of an alternative embodiment of the alternating-current power-amplifier voltage regulation circuit of Fig. 1.

Referring to the circuit shown in Fig. 1, there is shown at 11 a constant-frequency source which has an output of any desired wave form, preferably but not necessarily substantially sinusoidal. One output terminal of the constant-frequency source 11 is connected to a common potential datum or ground at 12 and the other output terminal is connected through a blocking and coupling capacitor 13 and a series grid resistor 14 to the grid 15 of a triode 16. Although the tube 16 is shown as a triode it will be understood that a tetrode, pentode or other type tube might be used. A grid-leak resistor 17 is connected between ground 12 and the junction of the blocking capacitor 13 and the grid series resistor 14 so that an alternating voltage appears across the resistor 17 from the output of the constant frequency source 11. The cathode 18 of the triode 16 is connected to ground 12. The plate 20 is connected through the load resistor 23 to the B+ power supply. The plate 20 of the triode 16 is also connected through a blocking capacitor 21 to one terminal of a potentiometer 22 having its other terminal ground 12.

The circuit shown provides a substantially zero bias for the grid 15 of the triode 16 and the consequent clipping or limiting effect due to the flow of grid current through grid resistor 14 on positive half cycles of the input voltage produces an output at anode 20 which approaches a square wave form. This is one feature of the present invention, since a circuit which produces a sinusoidal output would be more complicated and less efficient. The square wave output of the triode 16 is advantageous in providing sensitive and efficient voltage regulator action and has no bearing on the final output wave form, since, as shown below, the square wave signal is later filtered to provide a sinusoidal wave form output.

The potentiometer 22 provides a manual output control, but it should be understood that any equivalent device might be used for this purpose. An adjustable tap 25 of the potentiometer 22 is connected through a low pass or band-pass filter 23 to an amplifier 27 from whose output terminal 28 is derived the regulated output. The filter 26 blocks the high frequency components of the square wave output of the triode 16 above the fundamental frequency of source 11, thereby converting the output to a sine wave signal. By way of example, filter 26 could be a two-stage "pi" or ladder filter having a cut-off just above the frequency of source 11. A band pass filter of any desired design could be used alternatively to perform the function of converting the signal to a sine wave form. Such a band pass filter would of course be designed to pass the frequency of source 11 and exclude its harmonics. The amplifier which is shown schematically at 27 may in practice be a multi-stage amplifier chain and may have an output of any power whatsoever, as the voltage regulation circuit is not limited to amplifiers with a particular power rating. For this reason, regardless of the power output of source 11, the system of the present invention may provide any desired power output, with the same effectiveness of regulation.

The system as thus far described represents an unregulated power-amplifier power supply to which the voltage regulation circuit is applied, but it should be understood that the application of the voltage regulation circuit is not limited to the type of power-amplifier power supply which is shown, but may be used to regulate any similar type of alternating-current power-amplifier.

A potentiometer 30 is connected between the output terminal 28 and ground 12, so that the power supply alternating output voltage appears across the potentiometer

30. An adjustable tap 31 of the potentiometer 30 derives a desired portion of this output voltage, and is connected to the plate 32 of a rectifier illustrated as a diode 33, so that any desired proportional part of the A. C. voltage may be applied to the rectifier 33 by proper adjustment of the adjustable tap 31. A filter condenser 36 and a rectifier load resistor 35 are connected in parallel between the cathode 34 of diode 33 and ground 12. These elements operate in a well-known manner to derive a direct voltage proportional to the selected alternating voltage value and to filter the A. C. component from the rectifier output. Although a thermionic half-wave rectifier is shown, it is obvious that any equivalent half-wave or full-wave rectifying means would suffice.

The diode cathode 34 and load resistor 35 are connected to the control grid 37 of a pentode tube 38. Hence a positive rectified voltage is applied to the grid 37 which is substantially proportional to the alternating output voltage at terminal 28. Furthermore, the proportion of the output voltage represented by the rectified voltage may be varied by moving the tap 31 on the potentiometer 30.

The cathode 40 of the pentode 38 is connected through the voltage reference tube 41 to ground 12. The junction of the cathode 40 and the reference tube 41 is connected through the reference tube resistor 42 to B+ so that the cathode is maintained at a fixed reference voltage by the characteristic function of the voltage reference tube. The pentode suppressor grid 43 is directly connected to the cathode 40. Voltage dividing resistors 44 and 45 are connected in series between B+ and ground 12 and the screen grid 46 of tube 38 is connected to the junction of these voltage-dividing resistors. The relative resistance values of the resistors 44, 45 are chosen to maintain the grid 46 at a desired proportion of the B+ voltage.

The plate 47 of the pentode 38 is connected directly to the plate 20 of the triode 16 so that a shunt path is provided for the output of the triode 16 through the pentode 38 to ground 12. The effective impedance of the shunt path is dependent upon the potential applied to the pentode control grid 37. If a potential is applied to the pentode control grid 37 which is sufficiently negative with respect to the cathode 40, the pentode 38 will tend to cut off, thereby providing a very high impedance of the shunt circuit. When the pentode is cut off the impedance of the shunt path will be so high that it will have substantially no effect on the triode circuit and the A. C. output of the triode 16, will pass into the amplifier 27 unaffected except by the setting of the output potentiometer 22.

On the other hand, if the difference between cathode and grid potentials is less than cut-off, the pentode impedance is lower, depending upon the value of that difference, and a substantial amount of the triode output will be shunted through the pentode to ground rather than continuing to the potentiometer and thence to the amplifier section.

From the foregoing it may be seen that when the pentode is not cut off it shunts a part of the triode output thereby reducing the input to the amplifier and reducing the power supply output voltage. This in turn reduces the voltage on the pentode grid until a balance is reached. The regulator circuit thereby effectively maintains the pentode grid at a potential substantially equal to the voltage-reference tube reference voltage minus the pentode cut-off voltage. As previously explained, this control grid potential is proportional to the power supply output voltage appearing across the potentiometer 30, so that in stabilizing the grid potential the output voltage is also maintained at a constant value. This constant output voltage may be set at any value greater than the reference voltage minus the pentode cut-off voltage, limited, of course, by the output capabilities of the amplifier 27.

Although a pentode 38 has been described as the regulating element in the voltage regulation circuit, it might be replaced by any equivalent amplifying device. It should be noted, however, that it is advantageous to use a sharp cut-off pentode to attain a high degree of sensitivity and thus a good voltage regulation.

Referring now to Fig. 2, it will be seen that the alternative embodiment of the invention therein is similar in many respects to the device of Fig. 1, and corresponding elements have been given the same reference number. There is shown at 11 a constant frequency source with one output terminal connected to ground 12 and the other terminal connected through blocking and coupling capacitor 13 and series grid resistor 14 to the grid 15 of a triode 16. As in the circuit of Fig. 1, the use of a triode is exemplary only and another equivalent tube could be used in the alternative. Input resistor 17 is connected between ground 12 and the junction of the blocking capacitor 13 and the grid resistor 14. The output of the triode 16 is a clipped or square wave as explained in the discussion of Fig. 1.

The circuit of Fig. 2 differs from that of Fig. 1 in that the plate 20 of the triode 16 is not connected directly to B+ but is rather connected through the load resistor 23 to the cathode 52 of a pass triode 24. The plate 51 of the triode 24 is connected directly to B+, so that the two triodes are effectively connected in series and the plate voltage at the plate 20 of the triode 16 is affected by the voltage drop across the triode 24. Plate 20 of the triode 16 is also connected through the blocking capacitor 21 and the potentiometer 22 to ground 12 as before. The low pass filter 26 is connected to the adjustable tap 25 of the potentiometer 22 so that an adjustable proportion of the signal from the triode 16 is converted into a sinusoidal wave form by the low pass filter 26. The input of the amplifier 27 is connected to the low pass filter 26 and the output of the amplifier 27 is connected to the output terminal 28 so that an amplified constant-frequency sinusoidal wave form is supplied at the output terminal 28 of the power supply in a manner similar to that described in connection with Fig. 1.

The output voltage of the power supply is sampled at a potentiometer 30, rectified in a rectifier 33 and applied to the grid 37 of a pentode 38 in identically the same manner as described in Fig. 1. The cathode 40 of the pentode 38 is maintained at the reference voltage in the same manner previously described for Fig. 1. The suppressor grid voltage and the screen grid voltage are likewise provided as in Fig. 1.

Contrary to Fig. 1, however, the plate 47 of the pentode 38 is independently connected to B+ through a load resistor 48. The plate 47 is also connected directly to the control grid 50 of the triode 24. Thus it will be seen that in the circuit of Fig. 2 the pentode does not directly affect the output of triode 16 but rather the amplified signal from the pentode 38 is applied to the control grid 50 of the triode 24. In the circuit of Fig. 2 a reduction in the output voltage of the power supply results in a reduction of the grid voltage on the pentode 38 in the same manner as in Fig. 1. However, this reduction in grid voltage tending to cut off the pentode now raises the voltage at the pentode plate 47 and consequently raises the voltage on the grid 50 of the pass triode 24. Raising the grid voltage of the pass triode 24 decreases the internal impedance of and the voltage drop across the pass triode 24 thereby raising the effective plate voltage of the triode 16.

Effectively raising the plate voltage of the triode 16 will increase the output of the triode and hence of the amplifier. Conversely, an increase in the output of the amplifier so that the grid 37 of the pentode 38 is substantially above cut-off causes a drop in the pentode plate voltage, a drop in the grid voltage of the triode 24, and a drop in the effective plate voltage of the triode 16 so that the output of the first stage and hence of the power supply is reduced to maintain a regulated output.

It may be seen from the foregoing that the circuit of Fig. 2 operates to maintain the potential at the pentode grid at such a value that the pentode is very near cut-off. This produces a controllable stabilized output voltage in the same manner previously described with respect to Fig. 1.

The circuits shown yield a high degree of voltage regulation and are particularly well adapted to show the basic principle of operation of the circuit. However, a substantial improvement in either of the above circuits may be made where it is desired to have a particularly wide range of very stable voltage regulator operation. This may be accomplished by changing some of the connections from ground 12 as shown in Figs. 1 and 2 to the cathode 40 of the pentode 38. As previously explained, the cathode 40 is maintained at a stable positive reference voltage by the operation of the reference tube 41. This provides some limitation on the range of operations, since in effect the potential of the plate 47 of pentode 38 cannot be reduced below that reference voltage, which correspondingly limits the variations of potential at plate 20 of triode 16. One such change that can be made is in the ground connection 12 of the screen voltage dividing resistors 44 and 45. By changing the screen resistor connection from ground to the higher potential at the pentode cathode 40 the unavoidable fluctuations of the screen voltage due to screen current and B+ variations are considerably reduced. This is fairly obvious since it may be seen that the design voltage drop across the screen voltage dividing resistor 45 and hence its resistance value may be substantially reduced when it is connected to the higher potential point represented by the cathode 40. Since the voltage across the resistor 45 may be less, a given percentage fluctuation in the drop across the resistor will result in a lesser variation in the screen to cathode voltage. It is particularly advantageous to use this method of increasing the stability of the screen grid voltage because the customary by-pass condenser used for this purpose in radio and audio circuits is not effective nor practical due to the comparatively low frequency of the variations involved in such a voltage regulator circuit. Stabilizing the screen voltage in this manner allows the use of a lower screen-cathode voltage to increase the pentode sensitivity and hence the degree of voltage regulation.

A second set of ground connections which may advantageously be changed to the cathode 40 is the ground connection of the triode cathode 18 and the ground 12 associated with the grid resistor 17 of this tube. The advantage of changing these ground connections to the higher stable potential of the cathode 40 may be seen from a consideration of the operation of the circuit when the output of the triode 16 in Fig. 1 is much too high to produce the desired output voltage and is therefore being largely shunted through the pentode by the operation of the circuit as previously described. Under these conditions it may be seen that the shunting effect of the pentode in Fig. 1 is substantially limited by the fact that its cathode potential is higher than the cathode potential of the triode 20. This limitation is removed by raising cathode potential of triode 20 to the potential supplied by the voltage reference tube at the pentode cathode 40. In the circuit of Fig. 2 a similar advantage may be obtained by changing the cathode and grid input resistor ground connections of the triode 16 to the higher potential of the pentode cathode 40. In this case, however, the advantage is realized due to the rise in the cathode potential of the pass triode 24 and hence the lower voltage of the grid 50 of the triode 24 with respect to the cathode 52. Lowering of the grid potential improves the control of the triode 24 and hence improves the control of the voltage at the plate 20 of the triode 16. Hence the control of the output of the triode 16 and of the power supply is improved.

Thus it may be seen that a wider degree of control and a greater sensitivity may be achieved by the slight modifications described without changing the basic operation of the voltage regulator circuits.

In any of the embodiments described the output control potentiometer 22 and the regulator potentiometer 30 may be operated in conjunction to achieve a very wide range of output voltage. The adjustment necessary to set the power supply at a desired voltage is as follows:

The potentiometer tap 31 is set to the maximum output voltage position (at the lower end of potentiometer 30) thereby eliminating the influence of the voltage regulator circuit. The potentiometer 22 is then adjusted to provide an output voltage substantially higher than desired. This output voltage is reduced to the desired value by adjustment of tap 31 on potentiometer 30. Obviously the potentiometers could be interconnected for single knob control if desired.

It should be understood that the overall efficiency of the voltage regulator circuit is greatly enhanced by the wave form squaring action of the triode stage of the power supply. The particular advantage of the squaring action will be seen from a consideration of the operation of the triode wave form squaring stage in Fig. 1. Ignoring for the present the effect of the voltage regulator action, it will be seen that as the sine wave output of the frequency source starts a positive half-cycle, a positive voltage will appear across the grid leak resistor 17 and a positive potential will be applied to the grid 20 of the triode 16. As the grid becomes more positive, however, a grid current will flow through the series grid resistor 14 causing a voltage drop tending to lower the grid potential. As a result of the grid resistor limiting action the grid is maintained at a substantially constant low positive potential during the positive half-cycle of the input. This produces a substantially constant low positive potential at the plate 20 since the impedance of the tube and hence the voltage drop across the tube is minimum during the positive half of the input cycle.

During the negative half of the input cycle the impedance of the tube rises rapidly and the plate potential is increased to substantially the B+ voltage. Hence the negative half-cycle produces a rapid rise in the plate potential to a value almost equal to the B+ potential and the plate remains substantially at B+ voltage through most of the negative half of the input cycle. Hence in the absence of voltage regulator action the triode output is a clipped or substantially square wave with a lower limit imposed by grid current limiting action and an upper limit imposed by the B+ voltage.

Considering now the regulating action of the pentode 38 upon the triode stage, it will be seen that the impedance of the triode does not completely determine the potential at the plate of the triode, but rather the triode and pentode are effectively connected in parallel and their combined parallel impedance determines the potential at the plate of the triode. Hence a reduction of the pentode impedance reduces the voltage at the plate of the triode and thereby decreases the swing of the triode plate voltage and limits the A. C. output of the triode. The special advantage of the grid resistor limiting action and the zero bias of the triode 20 arises from the fact that the lower limit of the triode output wave form is determined by the grid resistor limiting action of the triode wave form squarer stage substantially independent of the effect of the pentode regulator action. Therefore the lowering of the upper limit of the triode output wave form is not accompanied by proportionate lowering of the lower limit of the triode output wave form. The degree of control action on the triode peak-to-peak output produced by a given change in the pentode impedance is thereby increased due to the grid resistor limiting action in the triode stage.

The foregoing description of the unique advantage of the wave form squarer stage is equally applicable to the circuit of Fig. 2 with the understanding that a reduction of the potential at the plate 20 of the triode comes about as a result of the action of the pass triode 24 in series with the wave form squarer plate circuit. The pentode in Fig. 2 then produces the decrease in the swing of the potential of the plate 20 through the intermediate action of the triode 24 rather than directly.

It may be seen that the circuit provided has a high degree of sensitivity due to the inherent large amplification of the pentode 38. The circuit also inherently requires little power especially as compared with series-type regulators, since all regulation is done at low power levels, and no reliance is placed upon power absorption or voltage drops in the regulating system to produce the regulated output. Distortion is also largely eliminated. No reliance is placed upon the wave form of source 11, which may be nonsinusoidal. Only the frequency stability of source 11 is involved since it determines the output frequency of the system. Highly frequency-stable low-power sources are available to yield correspondingly stable high regulated power outputs, even in the many kilowatt range, by the present system. In particular, by having a sharp cut-off or sharply tuned filter 26, all harmonics and side bands of the source frequency due to regulating action can be cut off. Tests of a 60 cycle power supply incorporating the present invention have shown that the circuit will regulate power supply output voltage within 0.2% from full load to no load and that the circuit has a recovery time of less than 0.1 second and a distortion of less than 0.25%.

It should be understood that the above circuits are shown by way of example and are not to be taken as limiting the scope of the invention. Particular types of electron tubes have been shown in the exemplary circuits, but other types of tubes or completely different types of amplifying, rectifying, or voltage reference devices may be substituted within the spirit of the invention, and it should therefore be understood that the scope of the invention is to be limited solely by the appended claims.

What is claimed is:

1. An alternating current power amplifier power supply, comprising a source of substantially constant frequency, a wave form squarer stage coupled to said source, a bandpass filter coupled to the output of said wave form squarer stage, an amplifier coupled to said bandpass filter to receive the filtered output of said filter, a rectifier adapted to rectify at least a portion of output of said amplifier, said rectifier having a positive and a negative output terminal, a shunting tube having its control grid connected to the positive terminal of said rectifier, a voltage reference device connected between the cathode of said tube and the negative output terminal of said rectifier for maintaining said cathode at a substantially constant reference voltage with respect to said negative terminal, resistive means connecting the junction of said voltage reference tube and said cathode to a source of positive potential, and means connecting the cathode-to-plate path of said pentode in a shunt circuit across the output of the wave form squarer stage of said power amplifier, whereby the output voltage of said amplifier and hence of said power supply is regulated with reference to a voltage reference device.

2. A voltage regulator circuit as claimed in claim 1 wherein said wave form squarer stage is a zero-bias grid-current-limited triode amplifier stage.

3. An alternating current power amplifier power supply comprising a source of substantially constant frequency, a wave form squarer stage coupled to said source, a bandpass filter coupled to the output of said wave form squarer stage, an amplifier coupled to said bandpass filter to receive the filtered output of said filter, a rectifier adapted to rectify at least a portion of the output voltage of said amplifier, said rectifier having a positive and a negative output terminal, a shunting tube having its control grid connected to the positive output terminal of said rectifier to receive the rectified voltage, a voltage reference device connected between the said tube cathode and the negative output terminal of said rectifier for maintaining said cathode at a substantially constant reference voltage with respect to said negative terminal, resistive means connecting the junction of said cathode and said voltage reference tube to a source of positive potential, a further tube in series with the plate circuit of said wave form squarer stage of said power supply, and means for applying the output of said shunting tube to the control grid of said further tube, whereby the output voltage of said amplifier and hence of said power supply is regulated with reference to a voltage reference device.

4. A power amplifier power supply as claimed in claim 2 wherein said wave form squarer stage is a zero-bias grid-current-limited triode amplifier stage.

5. An alternating current power amplifier power supply, comprising a source of substantially constant frequency, a wave form squarer stage coupled to said frequency source, a bandpass filter coupled to the output of said wave form squarer stage and tuned to the frequency of said source, an amplifier coupled to said bandpass filter to receive the filtered output of said filter, a potentiometer connected across the output of said amplifier for providing an adjustable fraction of the amplifier output voltage, a rectifier coupled to the output of said potentiometer, said rectifier having a positive and a negative output terminal, a pentode with its control grid coupled to the positive terminal of said rectifier, a voltage reference tube connected between the cathode of said pentode and the negative terminal of said rectifier for maintaining said cathode at a substantially constant reference voltage with respect to said negative terminal, resistive means for connecting the junction of said voltage regulator tube and said cathode to a source of positive potential, and means connecting the cathode-to-plate path of said pentode in a shunt circuit across the output of said wave form squarer stage of said power supply, whereby the output voltage of said amplifier and hence of said power supply is regulated with reference to a voltage reference.

6. An alternating current power amplifier power supply, comprising a source of substantially constant frequency, a wave form squarer stage coupled to said frequency source, a bandpass filter coupled to the output of said wave form squarer stage and tuned to the frequency of said source, an amplifier coupled to said bandpass filter to receive the filtered output of said filter, a potentiometer connected across the output of said amplifier for providing an adjustable fraction of the amplifier output voltage, a rectifier coupled to the output of said potentiometer said rectifier having a positive and a negative output terminal, a pentode with its control grid coupled to the positive terminal of said rectifier, a voltage reference tube connected between the cathode of said pentode and the negative terminal of said rectifier for maintaining said cathode at a substantially constant reference voltage with respect to said negative terminal, resistive means for connecting the junction of said voltage regulator tube and said cathode to a source of positive potential, a triode with its cathode-to-plate path connected in series with the plate circuit of the wave form squarer stage of said power amplifier and means for applying said pentode output to the control grid of said triode, whereby the output voltage of said amplifier and hence of said power supply is regulated with reference to a voltage reference device.

References Cited in the file of this patent
UNITED STATES PATENTS

| | | |
|---|---|---|
| 2,247,468 | Barr et al. | July 1, 1941 |
| 2,664,540 | Beszedics | Dec. 29, 1953 |